(12) United States Patent
Genualdo et al.

(10) Patent No.: US 12,729,720 B2
(45) Date of Patent: Sep. 8, 2026

(54) SEALING DEVICE FOR BEARING UNIT

(71) Applicant: AKTIEBOLAGET SKF, Gothenburg (SE)

(72) Inventors: Piero Genualdo, Turin (IT); Daniele Duch, San Gillio (IT); Davide Bergesio, Pavarolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/058,466

(22) Filed: Feb. 20, 2025

(65) Prior Publication Data

US 2025/0277512 A1 Sep. 4, 2025

(30) Foreign Application Priority Data

Mar. 1, 2024 (IT) ........................ 102024000004672

(51) Int. Cl.
*F16C 33/80* (2006.01)
*F16C 33/78* (2006.01)

(52) U.S. Cl.
CPC ........ *F16C 33/805* (2013.01); *F16C 33/7823* (2013.01); *F16C 33/7883* (2013.01); *F16C 33/80* (2013.01)

(58) Field of Classification Search
CPC .... F16J 15/3232; F16J 15/447; F16J 15/4472; F16C 33/78; F16C 33/7823; F16C 33/7883; F16C 33/80; F16C 33/805
See application file for complete search history.

(56) References Cited

U.S. PATENT DOCUMENTS

| | | | | |
|---|---|---|---|---|
| 8,696,211 | B2 * | 4/2014 | Haepp | F16C 33/586 384/480 |
| 9,140,305 | B2 * | 9/2015 | Gulli | F16C 33/805 |
| 9,328,771 | B2 * | 5/2016 | Duch | F16C 19/04 |
| 9,956,820 | B2 | 5/2018 | Gulli et al. | |
| 10,605,369 | B2 * | 3/2020 | Kato | F16C 41/007 |
| 11,022,178 | B2 | 6/2021 | Uemoto et al. | |
| 2011/0044569 | A1 * | 2/2011 | Haepp | F16C 33/768 384/480 |
| 2015/0003766 | A1 * | 1/2015 | Duch | B60B 27/0073 384/480 |

(Continued)

OTHER PUBLICATIONS

Written Opinion and Search Report from the Italian Patent Office mailed Sep. 4, 2024 in related application No. IT 102024000004672, and translation thereof.

*Primary Examiner* — Nicholas L Foster
(74) *Attorney, Agent, or Firm* — J-TEK LAW PLLC; Scott T. Wakeman; Mark A. Ussai

(57) ABSTRACT

A sealing device for sealing a bearing unit between a stationary radially outer ring and a rotary inner flanged ring against external contaminants. The sealing device includes a rotary metal first shield which has a shaped annular form and is mounted on the flanged ring, a stationary metal second shield which has a shaped annular form and is mounted on the radially outer ring and an elastomer annular sealing element, which is wholly supported by the second shield, the sealing element having an annular contacting lip and a non-contacting lip arranged radially outside the contacting lip. The non-contacting lip has a curved cross-section defined by different radii of curvature and a radially outward-facing concavity.

8 Claims, 3 Drawing Sheets

(56) References Cited

U.S. PATENT DOCUMENTS

| | | | | |
|---|---|---|---|---|
| 2015/0097340 | A1* | 4/2015 | Gulli | F16C 33/80 277/349 |
| 2016/0236509 | A1* | 8/2016 | Gullì | B60B 27/0073 |
| 2018/0156336 | A1* | 6/2018 | Kato | F16C 33/805 |
| 2019/0049014 | A1 | 2/2019 | Villalobos et al. | |
| 2020/0292001 | A1* | 9/2020 | Uemoto | F16J 15/3264 |
| 2020/0392999 | A1* | 12/2020 | Häpp | F16C 33/80 |
| 2023/0016354 | A1* | 1/2023 | Dittmar | F16C 33/7889 |

* cited by examiner

SEALING DEVICE FOR BEARING UNIT

CROSS-REFERENCE

This application claims priority to Italian patent application no. 102024000004672 filed on Mar. 1, 2024, the contents of which are fully incorporated herein by reference.

BACKGROUND OF THE INVENTION

The present invention relates to seals, and more particularly to a sealing device for a bearing unit and the bearing unit provided with such a sealing device, preferably used in a wheel hub assembly.

Sealing devices formed as two-piece cassette seals are known, and typically include a rotary portion, for example mounted on the radially inner ring of the bearing unit, and a stationary portion, for example mounted on the radially outer ring of the bearing unit. For example, the stationary portion may include a metal shield that is interference fitted on the radially outer ring, and an elastomer portion co-molded on the metal shield. A second metal shield is interference fitted on the rotary radially inner ring. Further, the elastomer stationary portion of the seal includes one or more lips which are in contact with the rotary portion and which provide the inward seal of the bearing unit.

The typical design of a sealing device therefore includes one or more projections referred to as lips, having different shapes and orientations (typically axial and radial), which are in contact with surfaces of the rotary bearing unit. The sealing device thus prevents contaminants from entering from the outside, protecting the internal components of the bearing unit, i.e. the rolling bodies and the cages for the rolling bodies. Another important function of a sealing device is to prevent the egress of lubricants present inside the bearing unit.

A sliding friction force, and therefore energy dissipation, occurs between these contact lips and the corresponding rotary contact surfaces of the bearing unit. In general, the sealing capacity increases with the number of contact lips and the stiffness thereof. At the same time, however, as these parameters increase, so does the amount of energy dissipated.

As a result of increasingly strong global competition, there is a constant demand from customers, i.e. motor vehicle manufacturers, for continuous technical/economic improvements to wheel hub assemblies. In particular, as the technology evolves, there is increasing demand for components providing low energy-dissipation with the same performance levels as state-of-the-art solutions.

To solve this technical problem, the ideal situation would be a contactless sealing device that could still prevent the ingress of contaminants and lubricant loss, without dissipating energy. However, contactless sealing devices are often ineffective in certain circumstances, particularly in submerged environments.

It is therefore desirable to provide a sealing device with low energy-dissipation and also excellent sealing performance.

SUMMARY OF THE INVENTION

To substantially solve the technical problems set out above, one objective of the present invention is to provide a cassette sealing device including a rotary metal annular first shield and a stationary metal annular second shield, on which is mounted a sealing element provided with a contacting lip and a non-contacting lip intended to collect contaminants.

The present invention therefore provides a sealing device for a bearing unit having the features set out in the attached claims.

The present invention also relates to a bearing unit, and in particular to a bearing unit for a wheel hub assembly provided, at the axially outer end thereof, with a sealing device according to one of the embodiments of the present invention.

BRIEF DESCRIPTION OF THE SEVERAL VIEWS OF THE DRAWINGS

The invention is described below with reference to the attached drawings, which show a non-limiting example embodiment thereof, in which.

DETAILED DESCRIPTION OF THE INVENTION

Purely by way of example, the present invention is described below with reference to a bearing unit 30, preferably a motor vehicle wheel hub assembly provided with a bearing unit 30 having a sealing device 50 according to the present invention.

Figure 1:
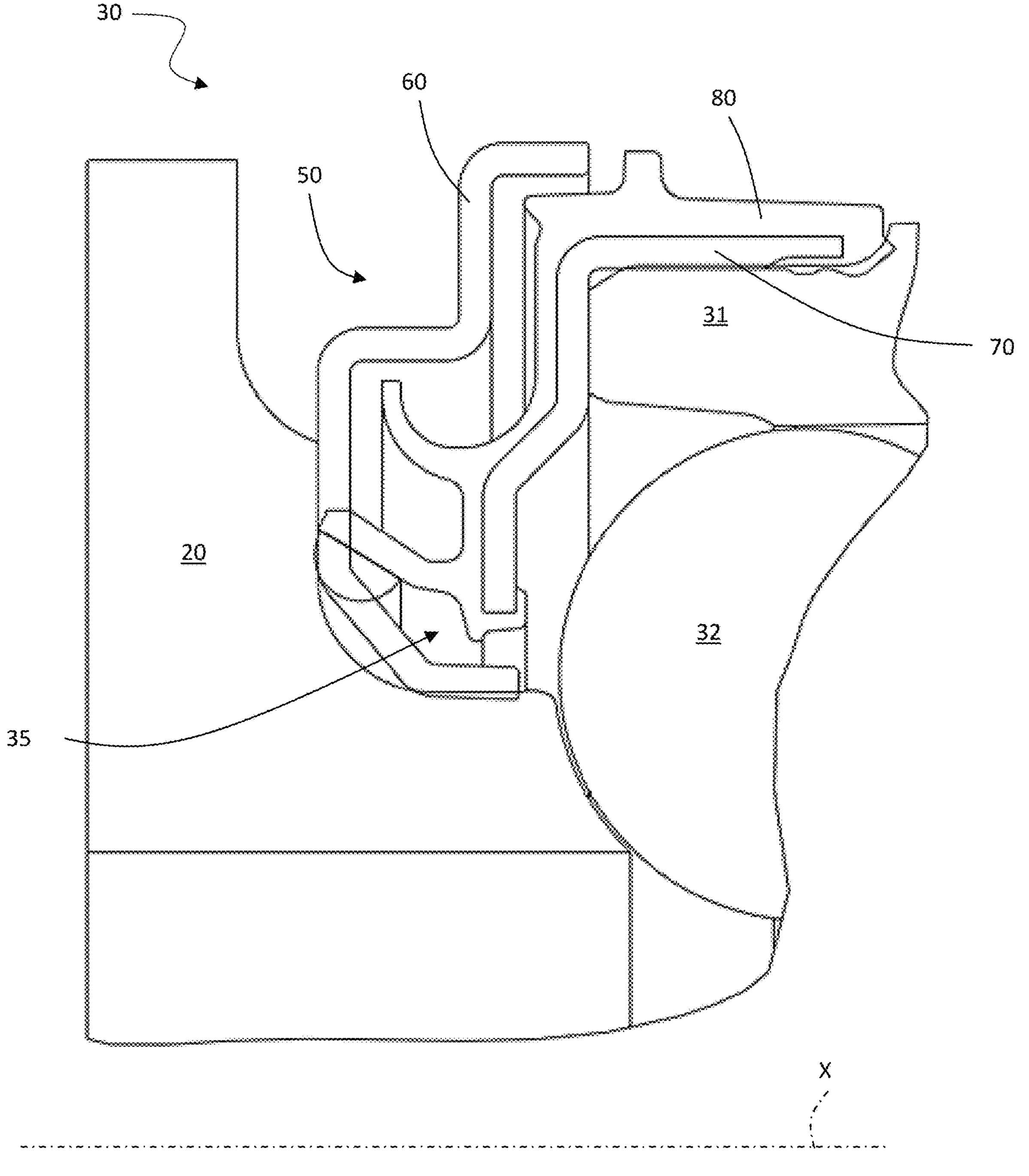
FIG. 1 is a partial cross section of a wheel hub assembly provided with a bearing unit.

In FIG. 1, a bearing unit or wheel hub assembly is denoted as a whole by reference number 30.

The bearing unit 30 has a central rotation axis X, and comprises at least a rotary radially inner flanged ring 20, a stationary radially outer ring 31, and a plurality of rolling bodies 32, in this example balls, interposed or disposed between the radially outer ring 31 and the flanged ring 20.

Throughout the present description and in the claims, terms and expressions indicating position and orientation, such as “radial” and “axial”, should be understood with reference to the central rotation axis X of the bearing unit 30. On the other hand, expressions such as “axially outer” and “axially inner” refer to the assembled state of the wheel hub assembly, and in this case preferably refer to a wheel side and to a side opposite the wheel side, respectively.

The flanged ring 20 and the radially outer ring 31 define, between each other and at the axially outer end, a gap 35 which, if unshielded, would allow contaminants and impurities to enter the bearing unit 30.

Therefore, in order to shield the bearing unit 30, at least one sealing device according to the present invention is mounted inside the gap 35. By way of example, reference is made below to a sealing device 50 mounted inside the axially outer gap 35. With obvious variants, and without departing from the scope of the invention, a sealing device mounted inside an axially inner gap can also be defined. It should be noted that the sealing device 50 is axially symmetrical about the rotation axis X of the bearing unit 30.

Figure 2:
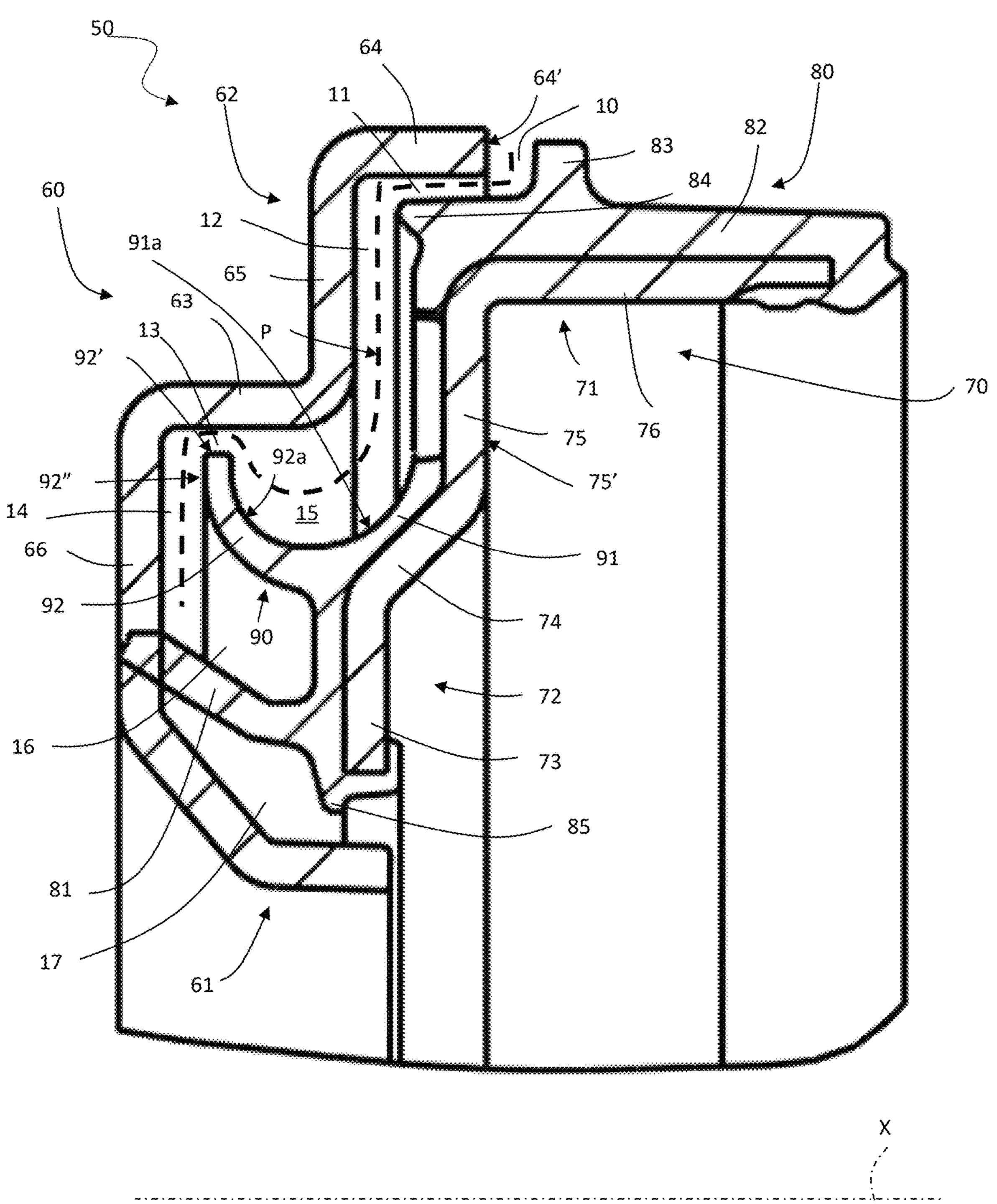
FIG. 2 shows a detail, on an enlarged scale, of the wheel hub assembly in FIG. 1 including a sealing device for a bearing unit, according to an embodiment of the present invention.

Also with reference to FIG. 2, according to an embodiment of the present invention, the sealing device 50 comprises:

- a rotary first shield 60 which has a shaped annular form and is preferably made of sheet metal so as to be relatively rigid, and is mounted on the flanged ring 20;
- a stationary second shield 70, which also has a shaped annular form and is preferably made of sheet metal so as to be relatively rigid, and is mounted on the radially outer ring 31; and
- an annular sealing element 80, which is wholly supported by the second shield 70.

The first shield 60 has a mounting portion 61 interference fit on the flanged ring 20 such that, during use, is rotary about the rotation axis X. In addition, the first shield 60 includes a peripheral portion 62 radially opposite the mounting portion 61 and having a first sleeve portion 63 and a second sleeve portion 64 that each extend axially and are connected to each other by a first flange portion 65, which extends radially. The first sleeve portion 63 is connected to the mounting portion 61 by a second flange portion 66 and is more radially proximal to the mounting portion 61 than the second sleeve portion 64.

The second shield 70 is coaxial with the first shield 60 and has a mounting portion 71 interference fit on the radially outer ring 31, the second shield 70 being stationary during use. In addition, the second shield 70 includes a support portion 72 radially opposite the mounting portion 71, the support portion 72 including a first flange portion 73, which extends radially towards the mounting portion 61 of the first shield 60 and carries a contacting lip 81, and a frustoconical intermediate portion 74 which connects the first flange portion 73 to the mounting portion 71 and which projects radially and axially from the mounting portion 71 towards the mounting portion 61 of the first shield 60. The intermediate portion 74 is partially arranged radially inside the first sleeve portion 63 of the first shield 60, the length of the intermediate portion 74 being determined by the type of application and the volume or space available for the sealing device 50.

The mounting portion 71 is arranged radially inside the second sleeve portion 64 of the first shield 60 and is arranged at least partially inside the second sleeve portion 64. The mounting portion 71 includes a second flange portion 75 which extends radially outwardly from the intermediate portion 74 and a sleeve portion 76 which extends axially from the second flange portion 75 from the side opposite the first shield 60 and is arranged radially adjacent to the second sleeve portion 64 of the first shield 60. Preferably, an axially inner surface 64' of the second sleeve portion 64 is co-planar with an axially inner surface 75' of the second flange portion 75.

The sealing element 80 has an annular contacting lip 81 and a non-contacting lip 90, which is radially outside the contacting lip 81. Both lips 81, 90 project axially and radially from the mounting portion 71 of the second shield 70 toward the first shield 60 and are therefore inclined at an angle relative to the axis X, so as to diverge from the axis X from the side facing the first shield 60.

Figure 3:
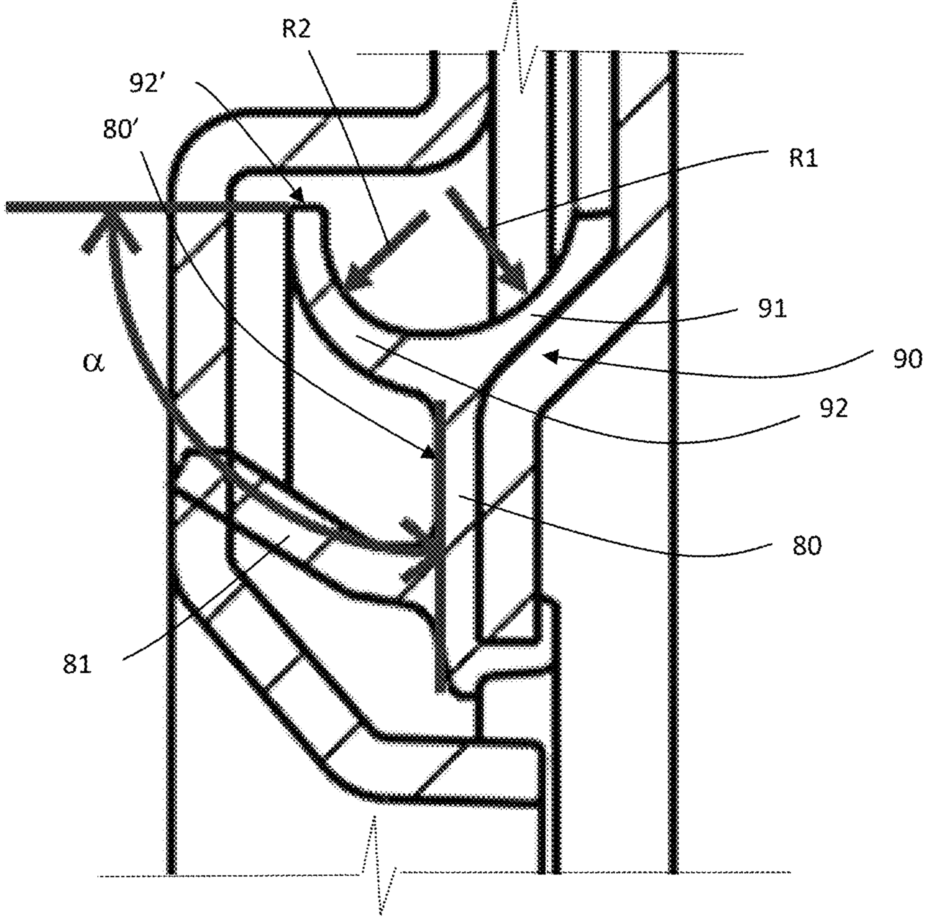
FIG. 3 shows a detail, on an even more enlarged scale, of the sealing device in FIG. 2.

In more detail and also with reference to FIG. 3, in a radial direction from the outside towards the axis X of symmetry, the sealing element 80 has and/or defines:

- a sleeve portion 82 which completely covers or encases the corresponding sleeve portion 76 of the second shield 70 on the side facing the first shield 60;
- a deflector 83 arranged or extending radially outwardly from the sleeve portion 82 and forming or defining an axial space 10 with the second sleeve portion 64 of the first shield 60; the axial space 10 is the only possible entry point of any contaminants and is sized relatively small or narrow in order to limit the entry of contaminants as much as possible;
- a radial space 11 defined between the sleeve portion 82 of the sealing element 80 and the second sleeve portion 64 of the first shield 60 along the entire length of the respective sections of the second sleeve portion 64 of the first shield 60 and of the sleeve portion 76 of the second shield 70, the sections overlapping axially (i.e. occupying the same axial position at different radial positions);
- an appendage 84 which projects axially outwardly from the sleeve portion 82 of the sealing element 80, which faces the first flange portion 65 of the first shield 60, defining a second axial space 12. The axial space 10, the radial space 11 and the second axial space 12 thus form a first section of a tortuous path P which impedes the ingress of contaminants into the sealing device 50. In addition, the appendage 84 pushes contaminants (mainly liquid) toward the first flange portion 65 of the first rotary shield 60, to which the contaminant tends to adhere. This further impedes the path of the contaminant towards the radially inner zone of the sealing device 50;
- a first chamber 15 defined between the first shield 60 and the sealing element 80 and delimited radially on the outside by the first sleeve portion 63 of the first shield 60, and axially and radially on the inside by the non-contacting lip 90; and
- the non-contacting lip 90, provided on the sealing element 80 to interact in a non-contacting manner with the first shield 60, has a curved cross-section defined by different radii of curvature and a radially outward-facing concavity.

The non-contacting lip 90 comprises:

- a rigid axially inner first portion 91 substantially completely covering the corresponding intermediate portion 74 of the second shield 70 on the side facing the first shield 60; and
- a free axially outer second portion 92 connected with, and preferably integrally formed with, the first portion 91.

The inner and outer portions 91, 92 are delimited radially on the outside by the respective curved surfaces 91*a* and 92*a*, which are joined together and have respective radii of curvature R1 and R2 (with R2<R1). The second portion 92 faces, via a radially outer surface 92', the first sleeve portion 63 of the first shield 60 and, via an axially outer surface 92", the second flange portion 66 of the first shield 60, defining a corresponding additional radial space 13 and a corresponding additional axial space 14 forming part of a second section of the tortuous path P. The second portion 92 of the non-contacting lip 90 has an angular extension a of between 80° and 100°. More precisely, the angle α is the angle between the radially outer surface 92' of the second portion 92 of the lip 90 and a cylindrical surface 80' of the sealing element 80 arranged radially between the contacting lip 81 and the non-contacting lip 90.

Continuing in a radial direction from the outside towards the axis X of symmetry, the sealing element 80 also has and/or defines:

- a second chamber 16, delimited axially on the outside by the second flange portion 66 of the first shield 60, axially on the inside by the sealing element 80, radially on the outside by the non-contacting lip 90 and radially on the inside by the contacting lip 81;

the contacting lip 81 which interacts slidingly with the second flange portion 66 of the first shield 60; and a third chamber 17, delimited radially on the outside by the contacting lip 81, axially on the outside and radially on the inside by the mounting portion 61 of the first shield 60 and axially on the inside by a second appendage 85 which projects radially inwardly from the sealing element 80 and is used to contain the lubricating grease of the bearing unit 30.

The sealing device 50 according to the present invention, by virtue of the features described above, enables a reduction in friction losses, not only without compromising sealing performance, but actually improving sealing performance. In fact, although on the one hand the sealing device 50 is provided with a single contacting lip 81 to minimize friction losses, on the other hand the sealing device has been designed with the aim of optimizing the efficiency of the tortuous path P that contaminants have to travel to enter the device, thereby drastically reducing the amount of contaminants able to reach the contacting lip 81.

This effect is first achieved by the shape of the curved cross-section of the non-contacting lip 90, the radially outward-facing concavity causing any contaminants entering from the first section of the tortuous path P (i.e., the axial space 10, the radial space 11 and the second axial space 12) to collect inside the first chamber 15, and may only reach the second chamber 16 to a negligible extent (where in any case it would be contained by the contacting lip 81). In addition, by means of adhesive effects caused by the relatively small or narrow size of the additional radial space 13 and the additional axial space 14, any contaminants may adhere to the first shield 60 (in particular the first sleeve portion 63 and the second flange portion 66) along a circumferential section. Finally, due to the centrifugal effect generated by the rotation of the first shield 60, such contaminants may then leave the sealing device 50 from positions circumferentially opposite the entry positions, and in all cases via the axial space 10. Ultimately, the shape of the non-contacting lip 90 optimizes the fluid dynamics of the seal, in particular by increasing the outward flow of contaminants.

In addition, the combination of the geometries of two components of the sealing device 50, the rotary first shield 60 and the stationary sealing element 80, enables the implementation of additional features which improve the overall dynamic seal:

the shaped metal form of the first shield 60, in particular the second sleeve portion 64, has been designed to reduce the axial space 10, which could allow contaminants to enter the radial space 11 and the second axial space 12;

the appendage 84 defined to push the contaminant towards the first shield 60, to which contaminants tend to adhere. Such adherence to the first shield 60 further impedes the path of contaminants toward the inside of the sealing device 50 and, again due to the centrifugal forces generated during the rotation of the first shield 60, encouraging the egress thereof from the axial space 10;

finally, especially at high speeds, the contaminant adhering to the first shield 60 exerts a force due to centrifugal and gravity effects on the non-contacting lip 90. As a result, the non-contacting lip 90 tends to bend, moving the axially outer surface 92" towards the respective flange portion 66 of the first shield 60. This has a beneficial contaminant-containment effect, as the axial space 14 between the first chamber 15 and the second chamber 16 is made smaller or has a reduced volume. The elastomer used for the non-contacting lip 90, i.e. of the sealing element 80, must not be too flexible in order to ensure that the non-contacting lip 90 does not bend too much, thereby risking contact with the first shield 60 and the consequent increase in friction losses. The risk of such lip contact has been determined to be extremely low, since the size of the axial space 14 is preferably about 0.8 mm and the bending of the non-contacting lip 90 preferably reduces the size of the axial space 14 by only a few hundredths of a millimeter.

Ultimately, the present invention differs from the prior art in that the use of the non-contacting lip 90, with its specific curved shape, improves the discharge of contaminants from the sealing device 50, due to the centrifugal force applied to such contaminants by the rotation of the first shield 60. In fact, the flow of contaminants is guided through the tortuous path P obtained by coupling the first shield 60 to the sealing element 80, before being discharged by the centrifugal effects of the rotary first shield 60.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sealing device for sealing from external contaminants between a stationary radially outer ring and a rotatable inner flanged ring of a bearing unit, the sealing device comprising:

a first annular shield configured to be mounted on the rotatable flanged ring and formed of a metallic material;

a second annular shield configured to be mounted on the stationary radially outer ring and formed of a metallic material, the second annular shield including a mounting portion configured to be interference fit to the radially outer ring, a support portion including a first flange portion extending radially toward the first shield and an intermediate truncated cone portion connecting the first flange portion to the mounting portion; and an annular sealing element integrally supported by the second shield and formed of an elastomeric material, the sealing element having an annular contacting lip carried on the first flange portion and a non-contacting lip located radially external to the contacting lip;

wherein the non-contacting lip includes a rigid axially inner first portion completely covering the truncated cone portion of the second shield on a side of the shield facing the first shield and a free axially outer second portion projecting from the second shield, the first portion being entirely delimited radially outwardly by a curvilinear surface having a radius of curvature and the second portion being entirely delimited radially outwardly by a curvilinear surface mated to the curvilinear surface of the first portion and having a radius of curvature, the radius of curvature of the curvilinear surface of the first portion being greater than the radius of curvature of the curvilinear surface of the second portion, the two curvilinear surfaces of the first and second portions being joined together to form a concavity in the external radial direction with an approximate semi-circular shape.

2. The sealing device according to claim 1, wherein the first shield has a mounting portion configured to be interference fit on the inner flanged ring and a peripheral portion radially opposite the mounting portion, the peripheral portion including a first axially-extending sleeve portion and a second axially-extending sleeve portion, the two sleeve portions being connected by a first radially extending flange portion.

3. The sealing device according to claim 2, wherein the second shield is coaxial with the first shield.

4. The sealing device according to claim 3, wherein the mounting portion of the second shield includes a second flange portion extending radially outwardly from the intermediate portion and a sleeve portion extending axially from the second flange portion.

5. The sealing device according to claim 4, wherein the sealing element has a sleeve portion completely covering the sleeve portion of the second shield on a side facing the first shield.

6. The sealing device according to claim 5, wherein the sealing element has a deflector extending radially outwardly with respect to the sleeve portion of the sealing element, an axial space being defined between the deflector and the second sleeve portion of the first shield.

7. The sealing device according to claim 5, wherein the sealing element has an appendage protruding axially outwardly from the sleeve portion of the sealing element and facing the first flange portion of the first shield.

8. A bearing unit provided with a sealing device according to claim 1, the sealing device being housed in a cavity axially external to the bearing unit, the bearing unit also including:

a radially inner and rotatable flanged ring;

a radially outer and stationary ring; and a plurality of rolling bodies disposed between the stationary ring and the rotatable flanged ring.

* * * * *